United States Patent
Muramatsu et al.

(10) Patent No.: US 7,230,906 B2
(45) Date of Patent: Jun. 12, 2007

(54) OPTICAL RECORDING MEDIUM INCLUDING A DIVIDED TRACK WITH BASIC PORTION AND EXTENSION PORTION

(75) Inventors: Eiji Muramatsu, Tokorozawa (JP);
Toshio Suzuki, Tokorozawa (JP);
Masahiro Kato, Tokorozawa (JP);
Shoji Taniguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/902,797

(22) Filed: Aug. 2, 2004

(65) Prior Publication Data
US 2005/0002320 A1    Jan. 6, 2005

Related U.S. Application Data

(63) Continuation of application No. 10/347,225, filed on Jan. 21, 2003, now Pat. No. 6,785,220, which is a continuation of application No. 09/598,291, filed on Jun. 21, 2000, now Pat. No. 6,535,477.

(30) Foreign Application Priority Data
Jun. 28, 1999  (JP) ................. 11-181572

(51) Int. Cl.
*G11B 7/24* (2006.01)
(52) U.S. Cl. .................... 369/275.3; 369/275.4
(58) Field of Classification Search .............. None
See application file for complete search history.

(56) References Cited

U.S. PATENT DOCUMENTS

| | | | | |
|---|---|---|---|---|
| 5,805,565 A | 9/1998 | Miyamoto et al. | ........ | 369/275.4 |
| 5,809,007 A * | 9/1998 | Takemura et al. | ........ | 369/275.3 |
| 5,930,222 A | 7/1999 | Yoshida et al. | ........ | 369/116 |
| 6,181,672 B1 | 1/2001 | Muramatsu et al. | ........ | 369/275.4 |
| 6,224,959 B1 | 5/2001 | Nagasaka et al. | ........ | 369/275.4 |
| 6,226,257 B1 | 5/2001 | Morimoto | ........ | 369/275.4 |
| 6,282,166 B1 | 8/2001 | Akiyama et al. | ........ | 369/275.3 |
| 6,345,033 B1 * | 2/2002 | Hayashi | ........ | 369/275.4 |
| 6,438,098 B1 | 8/2002 | Nakajima et al. | ........ | 369/275.4 |
| 6,493,312 B1 | 12/2002 | Negishi et al. | ........ | 369/275.4 |
| 6,504,815 B1 | 1/2003 | Fujii et al. | ........ | 369/275.4 |
| 6,594,224 B2 | 7/2003 | Muramatsu et al. | ........ | 369/275.4 |
| 6,667,949 B2 | 12/2003 | Stek et al. | ........ | 369/275.3 |
| 6,667,951 B1 | 12/2003 | Kim | ........ | 369/275.4 |

FOREIGN PATENT DOCUMENTS

| | | |
|---|---|---|
| EP | 0 871 169 | 10/1998 |
| JP | 01-307020 | 12/1989 |
| JP | 02-129717 | 5/1990 |
| JP | 08-077566 | 3/1996 |
| JP | 10-079125 | 3/1998 |
| JP | 11-025461 | 1/1999 |
| JP | 11-096555 | 4/1999 |
| JP | 11-273085 | 10/1999 |
| JP | 11-328675 | 11/1999 |

* cited by examiner

*Primary Examiner*—Tan Dinh
(74) *Attorney, Agent, or Firm*—Drinker Biddle & Reath LLP

(57) ABSTRACT

A recording medium and manufacturing method thereof, the recording medium comprising a control data area in which control data is prerecorded; and an information data area in which information data is to be recorded. The control data has a basic portion and an extension portion. The basic portion has a length corresponding to the information data.

18 Claims, 8 Drawing Sheets

01# OPTICAL RECORDING MEDIUM INCLUDING A DIVIDED TRACK WITH BASIC PORTION AND EXTENSION PORTION

This is a continuation application of application Ser. No. 10/347,225, filed on Jan. 21, 2003 now U.S. Pat. No. 6,785,220, which is a continuation application of prior application Ser. No. 09/598,291, filed on Jun. 21, 2000, which issued as U.S. Pat. No. 6,535,477. These two prior applications are incorporated by reference herein in their entireties.

BACKGROUND OF THE INVENTION

1. Field of the Invention

The present invention relates generally to an optical recording medium and a manufacturing method thereof, and more particularly to a user recordable optical recording medium and a manufacturing method thereof wherein unauthorized recording and reproduction of information data is disabled.

2. Description of the Related Art

At present, a write-once DVD-R (Digital Versatile Disc—Recordable) has been commercially produced as a user recordable optical recording medium having a recording capacity of several gigabytes (Gbytes), and a rewritable DVD-RW (DVD—Rewritable) is under development. In addition, a large amount of high quality copies can be made without substantial degradation with the significantly improved performance of such large capacity digital optical recording media and recording/reproducing apparatus.

FIG. 1 is a diagram showing a layout of a physical sector in a radial direction of a recording surface on a DVD-RW which is taken as an example. An information area for recording information data is made up of a lead-in area, a data area, and a lead-out area in this order from the starting point of the information area (i.e., starting point of the physical area) outwardly in the radial direction.

As shown in FIG. 2, the lead-in area contains data for use in reproducing the disc such as a reference code, control data, and so on. A control data region is comprised of 192 ECC (Error Correction Code) blocks. In FIG. 2, ECC blocks within the control data region are indicated using relative sector numbers in a range of 0 to 15. Each of the ECC blocks has the same contents. In other words, 192 ECC blocks having the same contents are recorded in succession. One ECC block is comprised of 16 sectors in which recorded are physical format information, disc manufacturing information, and contents provider information. Thus, data related to the reproduction of such information data is recorded in the control data region in the lead-in area upon recording information data on the disc. Upon reproduction of the disc, a reproducing apparatus reads these data to reproduce recorded information data such as video data based on the read information. In this way, the disc is recorded and reproduced.

OBJECT AND SUMMARY OF THE INVENTION

However, with the ability of readily providing a large amount of high quality copies as mentioned above, there has arisen a serious problem in the development of the copy protection technology for preventing unauthorized or illegal copies of recorded information data such as video and audio data, computer programs, and so on.

The present invention has been made in view of the problem mentioned above, and the object of the invention is to provide an optical recording medium and a manufacturing method thereof wherein unauthorized recording and reproduction of information data is disabled.

To achieve the object, according to one aspect of the present invention, there is provided an optical recording medium having an information data recording region including groove tracks and land tracks formed in alternation, each of the groove tracks carrying thereon a sequence of alternately appearing mark portions and space portions, the sequence representing an information data signal, and the land tracks being formed with a prepit train including at least one prepit which carries pre-information every predetermined data unit of the groove tracks, wherein at least a portion of the groove tracks comprises a plurality of groove portions separated by groove-absent portions in a rotational direction of the optical recording medium, each of the mark portions or each of the space portions includes one of the groove-absent portions.

According to another aspect of the present invention, there is provided an optical recording medium having an information data recording region including groove tracks and land tracks formed in alternation, each of the groove tracks carrying thereon a sequence of alternately appearing mark portions and space portions, the sequence representing an information data signal, and the land tracks being formed with a prepit train including at least one prepit which carries pre-information every predetermined data unit of the groove tracks, wherein at least a portion of the groove tracks comprises a plurality of groove portions separated by groove-absent portions in a rotational direction of the optical recording medium, each of the mark portions or each of the space portions includes one of the groove-absent portions, and at least one of two groove tracks adjacent to the prepit train has a continuous groove portion extending at least from a leading end to a trailing end of at least one prepit included in the prepit train in a rotational direction of the optical recording medium. According to another aspect of the present invention, there is provided an optical recording medium having an information data recording region including groove tracks and land tracks formed in alternation, each of the groove tracks carrying thereon a sequence of alternately appearing mark portions and space portions, the sequence representing an information data signal, and the land tracks being formed with a prepit train including at least one prepit which carries pre-information every predetermined data unit of the groove tracks, wherein at least a portion of the groove tracks comprises a plurality of groove portions separated by groove-absent portions in a rotational direction of the optical recording medium, each of the mark portions or each of the space portions includes one of the groove-absent portions, and at least one of two groove tracks adjacent to the prepit train has a continuous groove-absent portion extending at least from a leading end to a trailing end of at least one prepit included in the prepit train in a rotational direction of the optical recording medium.

According to another aspect of the present invention, there is provided an optical recording medium having an information data recording region including groove tracks and land tracks formed in alternation, each of the groove tracks carrying thereon a sequence of alternately appearing mark portions and space portions, the sequence representing an information data signal, and the land tracks being formed with a prepit train including at least one prepit which carries pre-information every predetermined data unit of the groove tracks, wherein at least a portion of the groove tracks comprises a plurality of groove portions separated by groove-absent portions in a rotational direction of the optical recording medium, each of the mark portions or each of the space portions includes one of the groove-absent portions, one of two groove tracks adjacent to the prepit train has a continuous groove portion extending at least from a leading end to a trailing end of at least one prepit included in the prepit train in a rotational direction of the optical recording medium, and another groove track of the two groove tracks adjacent to the prepit train has a continuous groove-absent portion extending at least from a leading end to a trailing end of at least one prepit included in the prepit train in a rotational direction of the optical recording medium.

According to further another aspect of the present invention, there is provided a method of manufacturing an optical recording medium having an information data recording region, comprising the steps of forming groove tracks carrying thereon a sequence of alternately appearing mark portions and space portions, the sequence representing an information data signal, and forming land tracks, in alternation with the groove tracks, having a prepit train including at least one prepit which carries pre-information every predetermined data unit of the groove tracks, wherein the step of forming groove tracks includes a step of forming a plurality of groove portions, at least in a portion of the groove tracks, separated by groove-absent portions in a rotational direction of the optical recording medium, each of the mark portions or each of the space portions includes one of the groove-absent portions.

According to another aspect of the present invention, there is provided a method of manufacturing an optical recording medium having an information data recording region, comprising the steps of forming groove tracks carrying thereon a sequence of alternately appearing mark portions and space portions, the sequence representing an information data signal, and forming land tracks, in alternation with the groove tracks, having a prepit train including at least one prepit which carries pre-information every predetermined data unit of the groove tracks, wherein the step of forming groove tracks includes a step of forming a plurality of groove portions, at least in a portion of the groove tracks, separated by groove-absent portions-in a rotational direction of the optical recording medium, each of the mark portions or each of the space portions includes one of the groove-absent portions, and at least one of two groove tracks adjacent to the prepit train has a continuous groove portion extending at least from a leading end to a trailing end of at least one prepit included in the prepit train in a rotational direction of the optical recording medium.

According to further another aspect of the present invention, there is provided a method of manufacturing an optical recording medium having an information data recording region, comprising the steps of forming groove tracks carrying thereon a sequence of alternately appearing mark portions and space portions, the sequence representing an information data signal, and forming land tracks, in alternation with the groove tracks, having a prepit train including at least one prepit which carries pre-information every predetermined data unit of the groove tracks, wherein the step of forming groove tracks includes a step of forming a plurality of groove portions, at least in a portion of the groove tracks, separated by groove-absent portions in a rotational direction of the optical recording medium, each of the mark portions or each of the space portions includes one of the groove-absent portions, and at least one of two groove tracks adjacent to the prepit train has a continuous groove-absent portion extending at least from a leading end to a trailing end of at least one prepit included in the prepit train in a rotational direction of the-optical recording medium.

DETAILED DESCRIPTION OF THE EMBODIMENTS

Several embodiments of the present invention will hereinafter be described in detail with reference to the accompanying drawings.

Figure 1:
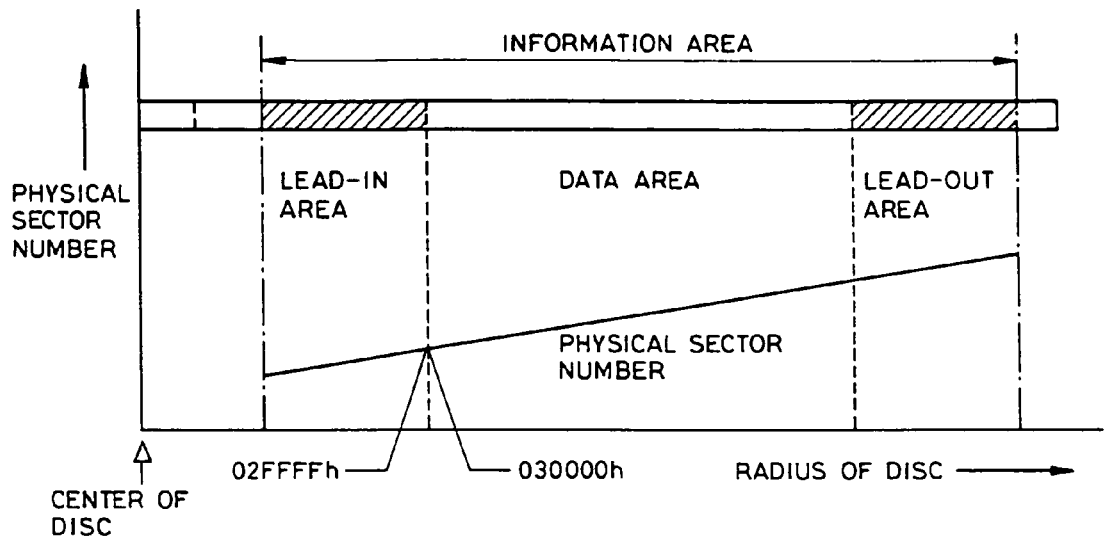
FIG. 1 is a diagram showing a layout of a physical sector on a write-once or a rewritable DVD in a radial direction of a recording surface.
Figure 2:
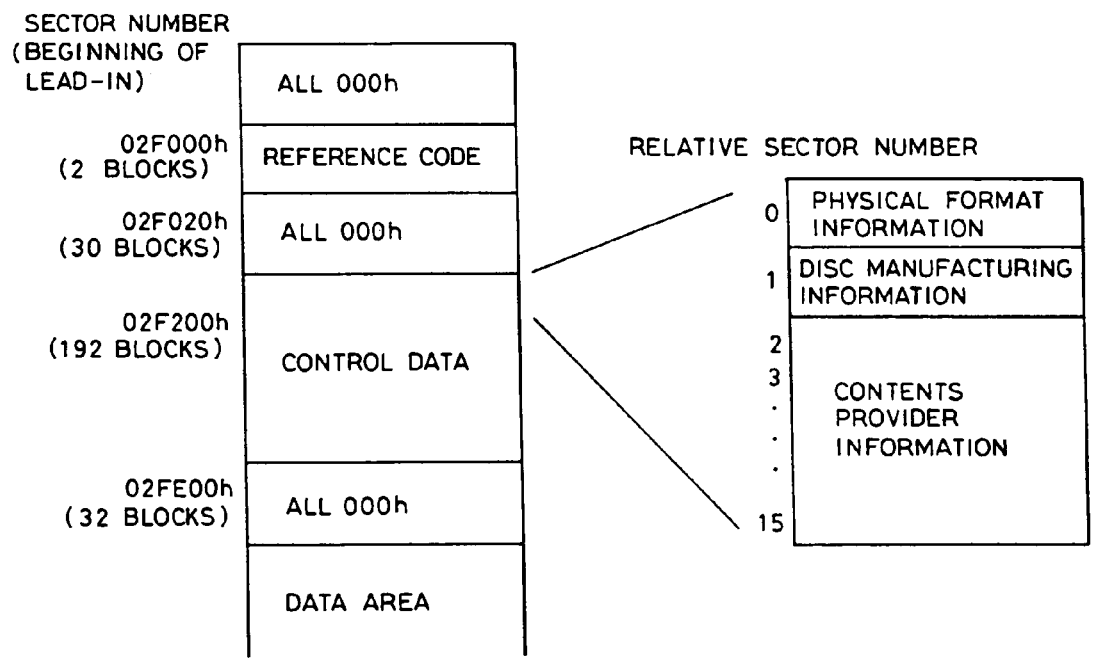
FIG. 2 is a diagram showing the structure of a lead-in area and a control data region.
Figure 3:
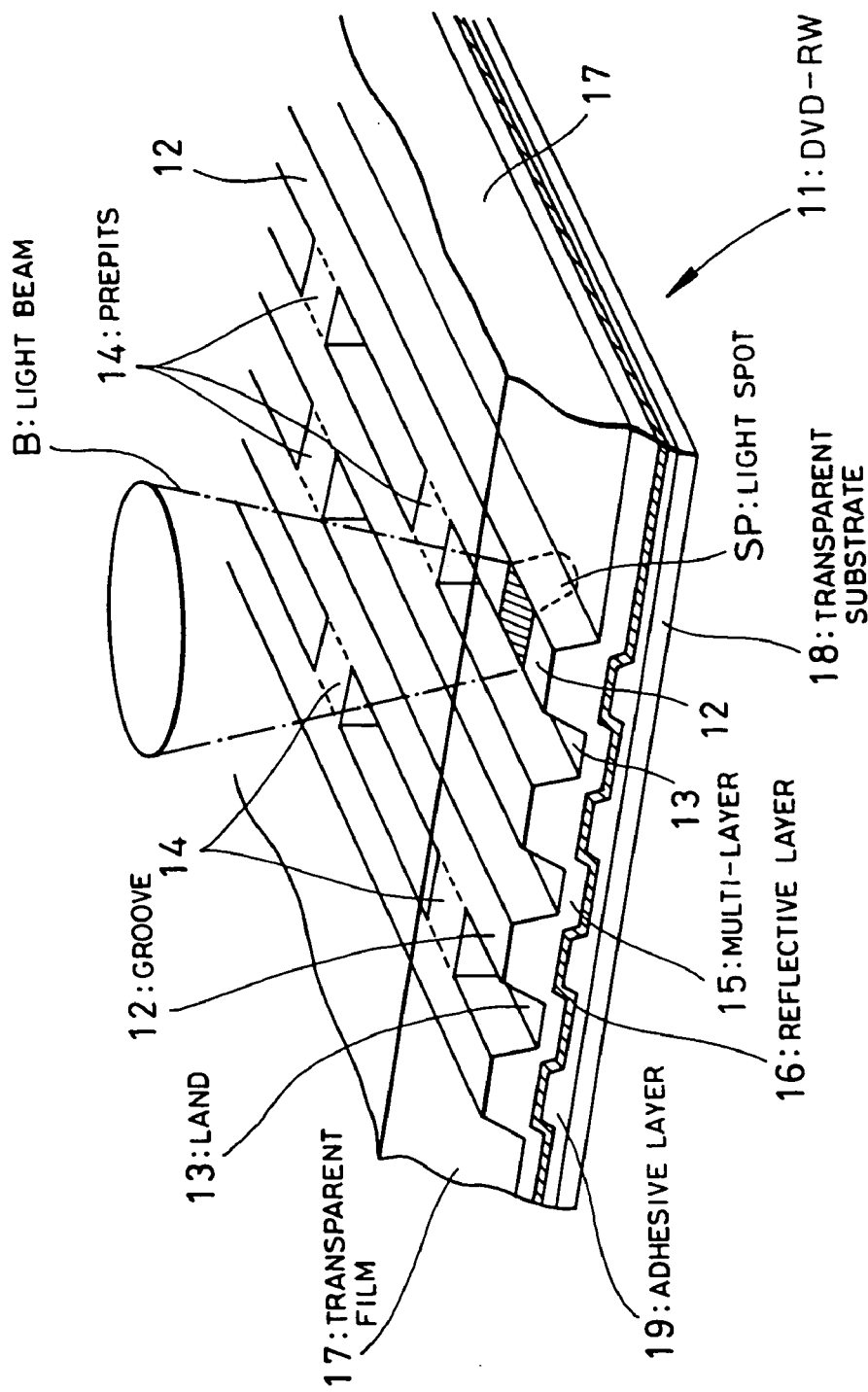
FIG. 3 is a perspective view illustrating the structure of a control data region in a conventional DVD-RW.

FIG. 3 is a perspective view illustrating the structure of a recording surface of a conventional recordable optical recording medium, where DVD-RW is taken as an example.

An optical disc (DVD-RW) 11 is a phase-change-type optical disc on which information data can be rewritten. The optical disc 11 comprises a multi-layer 15 comprised of a recording layer made of a phase change material (for example, GeSbTe or the like) as a data recording layer, and glass-based ($ZnS$—$SiO_2$) protection layers sandwiching the recording layer. The optical disc 11 is formed thereon with groove tracks 12 serving as information recording tracks, and land tracks 13 serving as guide tracks for guiding an optical beam (B) such as a laser beam or the like, which serves as reproducing light or recording light, to the groove tracks 12. The optical disc 11 further comprises a reflective layer 16 for reflecting the light beam (B) for reproducing recorded data, and an adhesive layer 19 for adhering the overlying layers on a transparent substrate (made of polycarbonate) 18. Further, the optical disc 11 is provided with a transparent film (made of polycarbonate) 17 for protecting the layers on the side from which the optical beam (B) enters. The land tracks 13 are formed with prepits 14 corresponding to pre-information (i.e., previously recorded information). The prepits 14 carry pre-information used by an information recording/reproducing apparatus for performing recording and reproduction, i.e., an address for recognizing a position on a groove track 12, and synchronization information. The prepits 14 have been preformed before the disc 11 is shipped.

In the optical disc 11, the groove tracks are further wobbled at a frequency corresponding to a disc rotating speed. The wobbled groove tracks 12 have been preformed before the optical disc 11 is shipped, as is the case of the prepits 14.

For recording certain recording information data (hereinafter, "recording information data" refers to information data such as image information which should be essentially recorded on the optical disc 11 other than the pre-information) on the optical disc 11, an information recording apparatus extracts the wobbling frequency of the groove tracks 12 to control the optical disc 11 to rotate at a predetermined rotating speed, and detects the prepits 14 to previously acquire the pre-information. Based on the acquired pre-information, the information recording apparatus sets an optimal output for the optical beam (B) as recording light, and so on, and acquires address information of the position on the optical disc 11 at which the recording information data is to be recorded. Based on the address information, the recording information data is recorded at a corresponding recording position.

Upon recording the recording information data, the optical beam (B) is irradiated such that the center of the optical beam (B) matches the center of the groove track 12 to form recording information pits corresponding to the recording information data on the groove track 12, thereby recording the recording information data. In this event, the size of a light spot (SP) is set such that a portion thereof is irradiated to the adjacent land tracks 13 as well as the groove track 12, as illustrated in FIG. 3.

Portions of the reflected light beam at the light spot (SP) irradiated to the land tracks 13 are used to detect pre-information from the prepits 14 to acquire the pre-information as well as to extract a wobble signal from the groove track 12 to acquire a recording clock signal synchronized with the rotation of the disc, for example, in accordance with a "radial push-pull method" using a photodetector which is divided by a division line parallel to the tangential direction of the groove track 12 (i.e., the direction in which the optical disc 11 is rotated).

Figure 4:
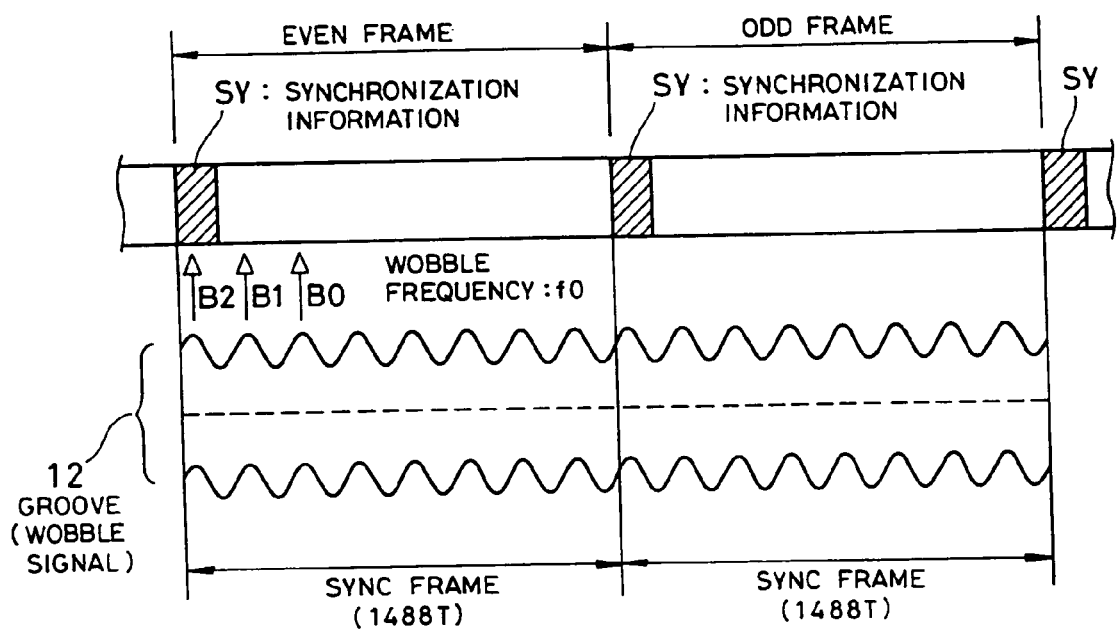
FIG. 4 is a diagram for illustrating the structure of frames and prepits in a physical sector.

A recording format for the pre-information previously recorded on the optical disc 11 will now be described with reference to FIG. 4. Specifically, in FIG. 4, the upper part illustrates a recording format in the recording information data, and the waveforms on the lower part illustrate, as a plan view of the groove track 12, a wobbling state of a groove track 12 on which the recording information data is recorded. Upwardly directed arrows between the recording information data and the wobbling state of the groove track 12 schematically indicate the positions at which prepits 14 are formed. It should be noted herein that FIG. 4 shows the wobbling state of the groove track 12 using an amplitude larger than the actual amplitude for facilitating the understanding. The recording information data is recorded on the center line of the groove track 12.

As illustrated in FIG. 4, the recording information data to be recorded on the optical disc 11 has been previously divided into sync frames as information units. Then, one recording sector is formed of 26 sync frames, and one ECC block is formed of 16 recording sectors. Specifically, one sync frame has a length 1,488 times longer than a channel bit length (hereinafter denoted by "T") defined by the recording format which is used for recording the recording information data (i.e., 1,488T). Further, a portion extending over the length of 32T at the head of each sync frame is used as synchronization information SY for establishing the synchronization for each sync frame.

The pre-information recorded on the optical disc 11, on the other hand, is recorded in each sync frame. Here, when the pre-information is recorded on the optical disc 11 in the form of prepits 14, one prepit 14 is formed for indicating a synchronization signal in the pre-information on a land track 13 adjacent to a region in which synchronization information SY is recorded in the respective sync frames in the recording information. Also, two or one prepit 14 is formed for indicating the contents of the pre-information to be recorded, on a land track 13 adjacent to the former half portion of the sync frame other than the synchronization information SY. As to the former half portion of the sync frame other than the synchronization information SY, the prepit 14 may not be formed depending on the contents of pre-information to be recorded. In this event, prepits 14 are generally formed only in even-numbered sync frames (hereinafter, referred to as "EVEN frames") to record pre-information. The exceptions will be described later. Specifically, in FIG. 4, the prepits 14 are formed in the EVEN frames (indicated by solid upwardly directed arrows in FIG. 4), whereas no prepits 14 are formed in odd-numbered frames adjacent thereto (hereinafter, referred to as "ODD frames"). More specifically, when prepits are formed in an EVEN frame, all prepits 14 (i.e., prepits B2, B1, B0 which are labeled in this order from the head of the sync frame) are formed in the first sync frame in a recording sector, and prepits B2, B0 are formed in a sync frame other than the first one in the recording sector when pre-information to be recorded in the sync frame is "1," and only a prepit B2 is formed when pre-information to be recorded is "0." Also, when prepits are formed in an ODD frame, prepits B2, B1 are formed in the first sync frame of a recording sector. In sync frames other than the first one in the recording sector, prepits are formed in a manner similar to those in the EVEN frame. Stated another way, the prepits 14 have different meanings in accordance with the varying prepit train of B2, B1 and B0.

Whether the prepits 14 are formed in the sync frame of the EVEN frame or the ODD frame is determined in accordance with the position of a prepit 14 previously formed on an adjacent land track. More specifically, while the prepits 14 are generally formed in the EVEN frame, if the prepits formed in the EVEN frame are located close to previously formed prepits 14 on an adjacent land track in the radial direction of the disc, the prepits 14 are formed in the ODD frame. By thus forming the prepits 14, the influence of crosstalk can be reduced when the prepits 14 are detected because no prepit 14 exists on an adjacent land track position.

The groove track 12, on the other hand, is wobbled at a constant wobbling frequency f0 of 140 kHz (i.e., a frequency at which eight cycles of wobble signal is contained in one sync frame) over the entire sync frame. Then, an information recording apparatus extracts the constant wobbling frequency f0 to detect a signal for controlling a spindle motor for rotating the disc, and to generate a recording clock signal.

Figure 5:
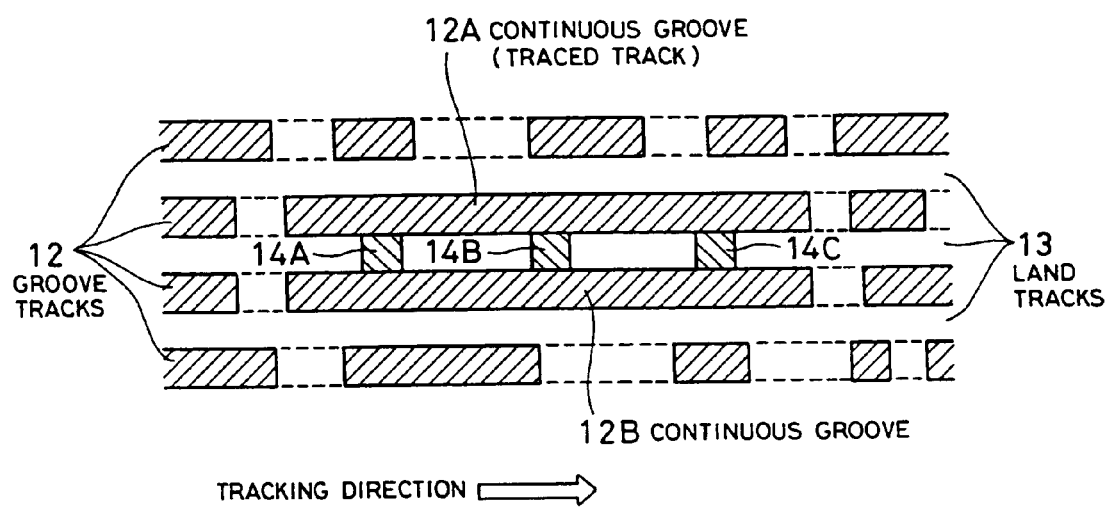
FIG. 5 is a plan view schematically showing groove tracks and land tracks in a control data section according to the first embodiment of the present invention.

A first embodiment of the present invention will be described in detail. FIG. 5 is a plan view schematically showing groove tracks 12 and land tracks 13 in a control data section in a lead-in area.

The groove tracks 12 are formed as intermittent groove tracks separated by portions of the same depth as the land tracks 13 (on the same plane), i.e., groove-absent portions, except for a neighborhood of a prepit train formed of three prepits 14A, 14B, 14C. The groove tracks 12 are created, for example, by 8/16 modulating a cutting light beam and turning ON/OFF the emitting power (with a duty ratio of approximately 50%) during the groove cutting. In other words, the groove tracks 12 have an intermittent structure, in which the groove tracks are divided based on a signal having the same frequency band as a recording RF signal (i.e., a recording signal after 8/16 modulated) recorded on the optical disc. It can be said that this structure is such that the lengths of each groove portion and groove-absent portion (hereinafter, referred to as the "mirror portion") correspond to the length of a pit and the interval between pits formed during information recording. Each of the groove portions corresponds to a mark (or a space) of the information data.

On a track traced for reading the prepits 14A, 14B, 14C, a continuous groove 12A adjacent to an entire area occupied by at least the prepits 14A, 14B, 14C is formed in a sync frame that includes these prepits. In other words, the groove 12A is formed as a continuous groove which extends at least from the leading end of the prepit train (i.e., the leading end of the prepit 14A) to the trailing end of the prepit train (i.e., the trailing end of the prepit 14C) in the tracking direction. Also, in the embodiment, another continuous groove 12B adjacent to the prepits 14A, 14B, 14C is formed on the opposite side of the continuous groove 12A beyond the prepits 14A, 14B, 14C.

When some 8/16 modulated information is recorded on the foregoing intermittent groove tracks having the structure described above and then reproduced, an RF signal reproduced from the intermittent groove tracks has an amplitude too small to read except for the region of the groove 12A. This is because the frequency due to the intermittence (i.e., ON-OFF) of groove tracks is in a frequency band equivalent to the recorded RF signal so that they interfere with each other. On the other hand, a pre-information signal can be read because the continuous grooves 12A, 12B do not cause such interference of the signals in a region in which the prepits 14A, 14B, 14C are formed. Also, in the region of the groove 12A, additional control signals such as a tracking error signal and a wobble signal other than the prepit signal must be read. As described above, since the groove portions exist in a duty ratio of approximately 50% in the intermittent groove tracks, the push-pull tracking error signal and the wobble signal have levels approximately one-half of those in the continuous grooves, but can serve sufficiently for tracking control.

Thus, by intermittently forming the groove tracks in the control data section of the lead-in area, except for a region adjacent to the prepits, even if control data is recorded in the control data section, a reproduced RF signal recovered from this portion exhibits a very low level, and consequently the control data cannot be reproduced. In other words, recording information data such as image information and so on, which should be essentially recorded and reproduced, cannot be reproduced, thereby making it possible to prevent unauthorized copies. However, for properly copying information data on the recording medium of the embodiment, a variety of techniques for avoiding the copy protection may be implemented in either hardware or software such as an avoiding apparatus, a computer program, and so on.

Figure 6:
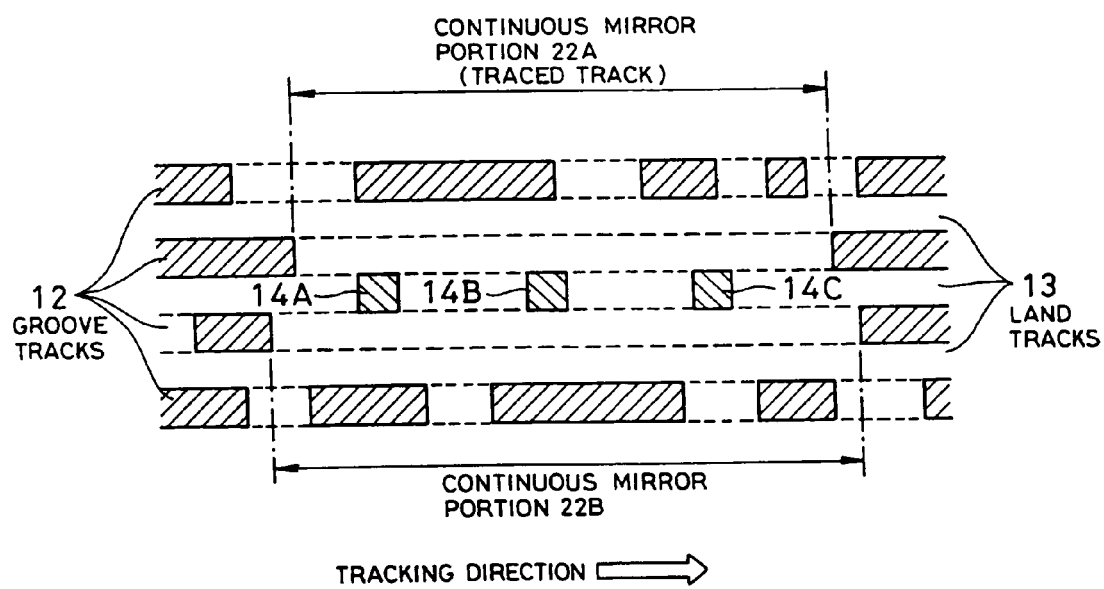
FIG. 6 is a plan view schematically showing groove tracks and land tracks in a control data section according to the second embodiment of the present invention.

A second embodiment of the present invention will be described in detail. FIG. 6 is a plan view schematically showing groove tracks 12 and land tracks 13 in a control data section in a lead-in area.

The second embodiment differs from the first embodiment in that a region adjacent to an entire area including prepits 14A, 14B, 14C is formed as a continuous mirror portion 22A on a track which is traced for reading the prepits 14A, 14B, 14C. More specifically, the mirror portion 22A is formed continuously at least from the leading end of the prepit 14A to the trailing end of the prepit 14C in the tracking direction. Also, in the second embodiment, another mirror portion 22B adjacent to the prepits 14A, 14B, 14C is formed opposite to the mirror portion 22A beyond the prepits 14A, 14B, 14C.

Thus, like the first embodiment, the foregoing structure prevents a reproduced RF signal from being read from the intermittent groove tracks in the recording region due to the interference of the intermittence of the groove tracks themselves with the recorded RF signal. On the other hand, pre-information can be read by the continuous mirror portions 22A, 22B in the regions adjacent to the prepits 14A, 14B, 14C.

It will be apparent that the continuous grooves of the first embodiment and the continuous mirror portions of the second embodiment may be used in combination. For example, a track traced for reading the prepits 14A, 14B, 14C may be formed with a continuous groove 12A adjacent to an entire area including at least the prepits 14A, 14B, 14C, while a mirror portion 22B may be formed so as to adjoin the prepits 14A, 14B, 14C on the side opposite to the continuous groove 12A beyond the prepits 14A, 14B, 14C.

Figure 7:
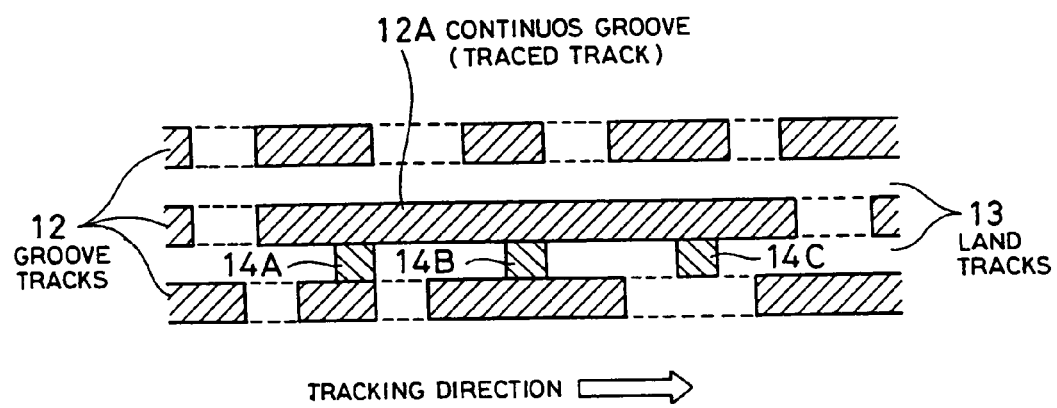
FIG. 7 is a plan view schematically showing groove tracks and land tracks in a control data section according to the third embodiment of the present invention.
Figure 8:
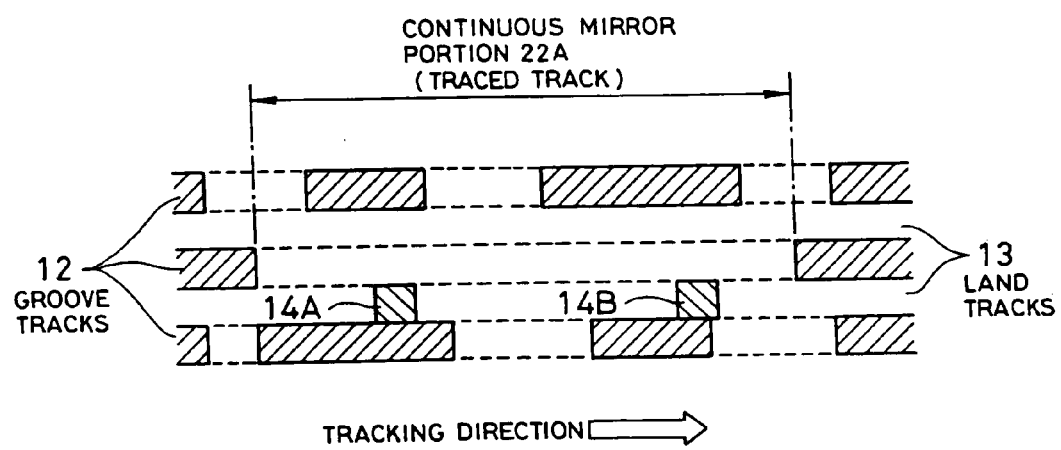
FIG. 8 is a plan view schematically showing groove tracks and land tracks in a control data section according to the fourth embodiment of the present invention.

A third and a fourth embodiment of the present invention will now be described with reference to FIGS. 7 and 8, respectively. FIGS. 7 and 8 are plan views schematically showing groove tracks 12 and land tracks 13 in a control data section in a lead-in area.

As can be seen from FIG. 7, the third embodiment differs from the aforementioned embodiments in that a continuous groove 12A adjacent to an entire area including at least prepits 14A, 14B, 14C is formed only on a track traced for reading the prepits 14A, 14B, 14C. Likewise, in this structure, pre-information can be read from this section since the interference of signals is avoided by the continuous groove 12A.

FIG. 8 in turn shows an example in which two prepits 14 are formed in sync frames other than the first one in a recording sector (i.e., prepits B2, B0 or prepits B2, B1). In the fourth embodiment, a continuous mirror portion 22A is formed instead of the continuous groove 12A, in which case similar effects to those of the foregoing third embodiment can be produced.

Figure 9:
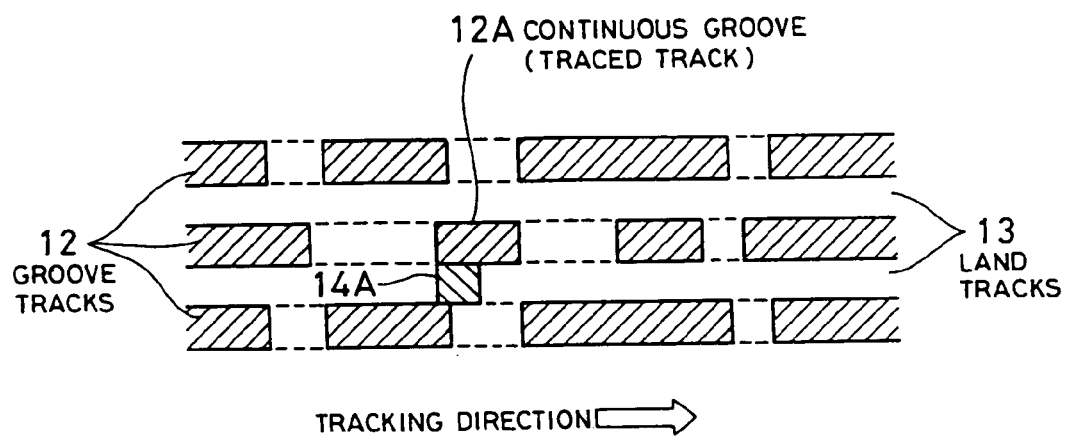
FIG. 9 is a plan view schematically showing groove tracks and land tracks in a control data section according to the fifth embodiment of the present invention.
Figure 10:
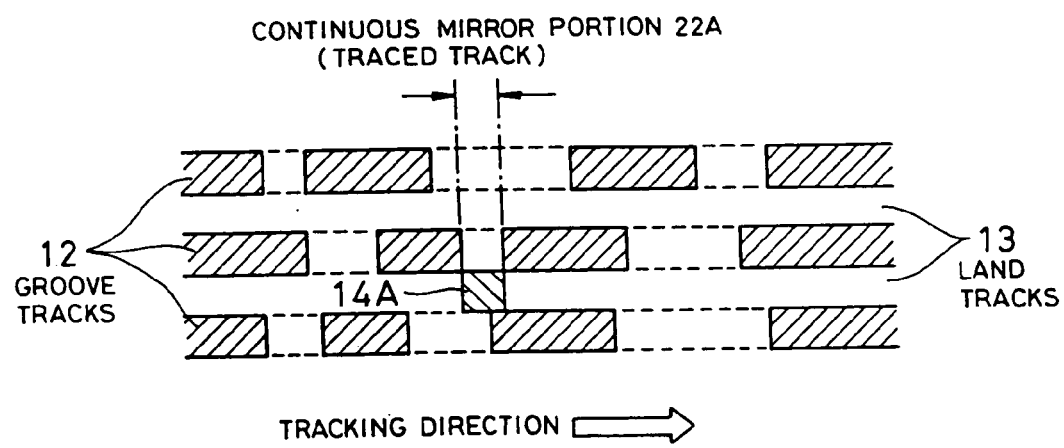
FIG. 10 is a plan view schematically showing groove tracks and land tracks in a control data section according to the sixth embodiment of the present invention.

A fifth and a sixth embodiment of the present invention will be described with reference to FIGS. 9 and 10, respectively. The fifth and sixth embodiments differ from the foregoing embodiments in that only one prepit 14A is formed. Even with these embodiments, a track traced for reading the prepit 14A is formed with a continuous groove 12A (FIG. 9) or a continuous mirror portion 22A (FIG. 10) adjacent to an entire area including at least the prepit 14A, i.e., extending continuously from the leading end to the trailing end of the prepit 14A in the tracking direction, to avoid the interference of signals, thereby making it possible to read pre-information.

Figure 11:
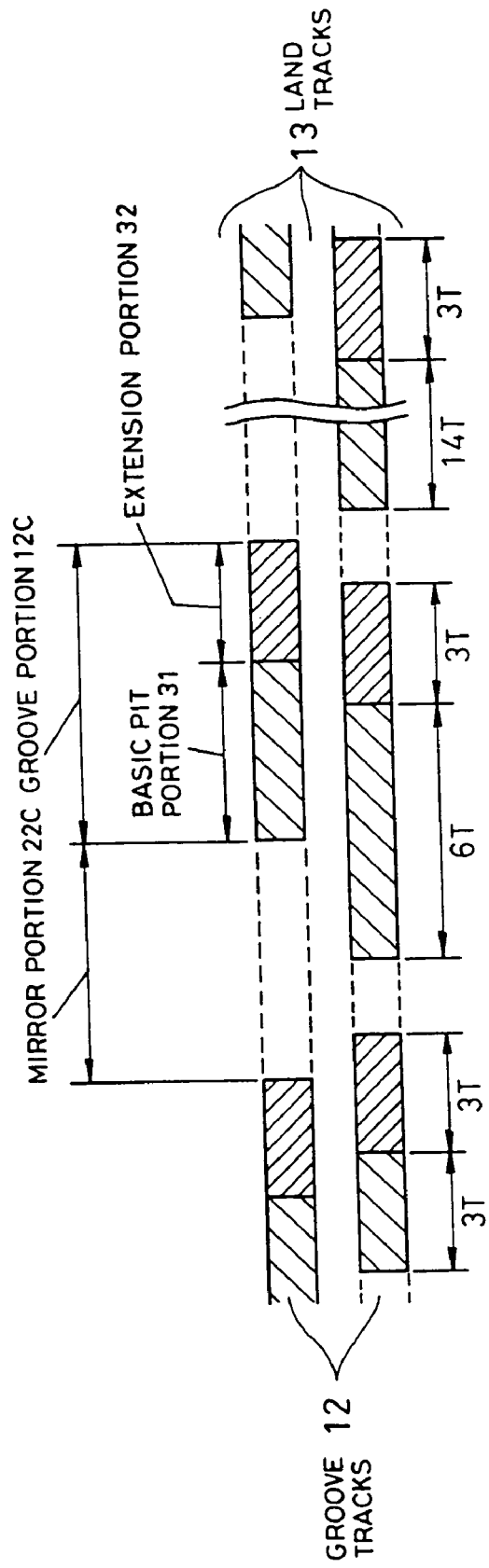
FIG. 11 schematically shows a configuration of groove tracks and land tracks in a control data section according to the seventh embodiment of the present invention.

A seventh embodiment of the present invention will now be described. As shown in FIG. 11, a control data section in the lead-in area contains groove tracks 12 and land tracks 13. The groove tracks 12 are divided into a plurality of groove portions 12C by mirror portions 22C.

In the embodiment, each of the groove portions 12C is comprised of a basic pit portion 31 and an extension portion (i.e., a groove-present portion) 32. The basic pit portion 31 has a pit length according to a mark (or a space) of the information data. For example, when 8/16 modulation is employed, in which 8-bit data is converted to 16 channel-bit data, a minimum pit length is 3T and a maximum pit length is 11T. As mentioned previously, T is a channel bit length. The maximum pit length is 14T when sync-pattern of 14T pit-length is used.

When forming the groove tracks 12 by dividing into a plurality of groove portions 12C, the duty ratio for all of the basic pit portions 31 in the groove tracks 12 is determined to be approximately 50%. Furthermore, in the embodiment, the groove portion 12C is comprised of a basic pit portion 31, and an extension portion 32 of a predetermined length. The extension portion 32 is added to the basic pit portions 31, in order to improve the detected signal level in a push-pull method (hereinafter, simply referred to as a push-pull signal level).

Figure 12:
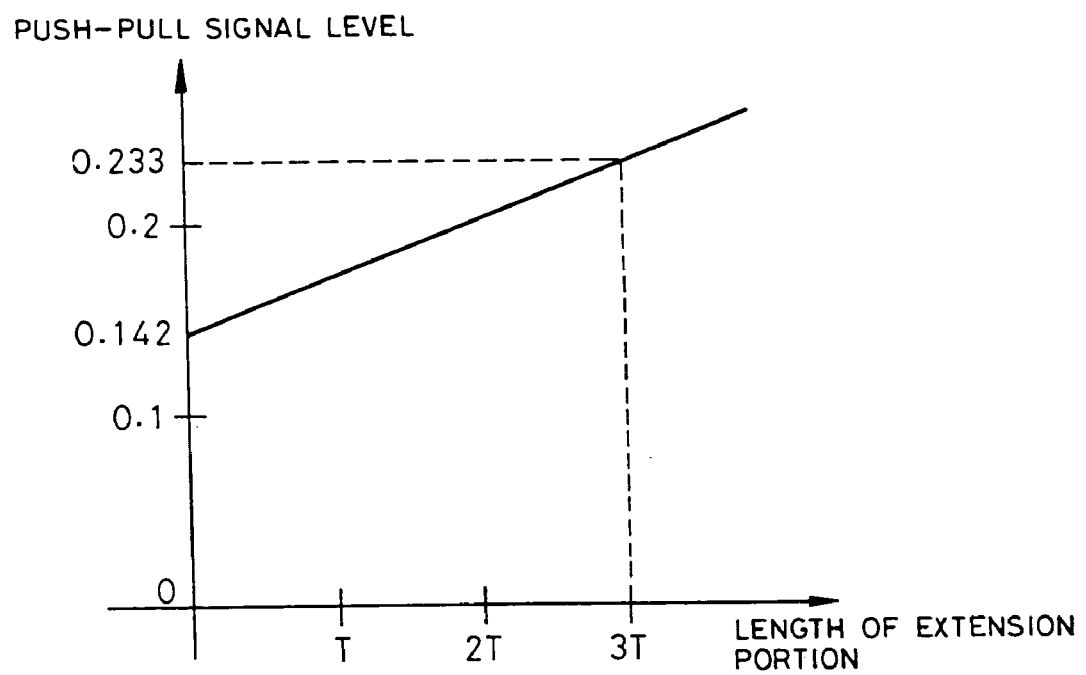
FIG. 12 shows a push-pull signal level variation against a length of an extension portion.

FIG. 12 shows a variation of push-pull signal level vs the length of the extension portion 32. The push-pull signal level is 0.142 when the extension portion 32 is not added. The push-pull signal level is increased as the length of the extension portion 32 is increased. The push-pull signal level of 0.233 is achieved, which is sufficient for tracking, when the length of the extension portion 32 is set to be 3T. There is, however, a trade-off that an effect to prevent an unauthorized recording and reproduction of information data is decreased.

It should be noted that the length of the extension portion 32 and the duty ratio of the basic pit portions 31 can be modified in consideration of, for example, the detected signal level. The length of the extension portion 32 is not limited to a fixed length as presented in the above-mentioned embodiment. The length of the extension portion 32 may be determined in accordance with a length of the succeeding mirror portion. For example, the extension portion added to a basic pit portion may have a length proportional to a length of the mirror portion succeeding to the basic pit portion. The prepits described in the first through sixth embodiments can be provided.

Thus, according to the present invention, unauthorized recording and reproduction can be effectively prevented while the push-pull signal level, hence the tracking performance is improved by providing the extension portion 32 of a predetermined length to the basic pit portions 31.

It should also be noted that the continuous groove, continuous mirror portion, and so on shown in the foregoing embodiments may be used in combination as appropriate.

Also, while the foregoing embodiments have been described for an example in which the groove track 12 is divided according to a signal in the same band as an RF signal recorded on an optical disc, the groove track 12 may be divided according to a signal including a portion of a band of a recorded RF signal.

Further, while the foregoing embodiments have been described in connection with the DVD-RW which is taken as an example of an optical recording medium, the present invention is not limited to the particular recording medium, but may applied to other optical recording media, for example, DVD-R or the like.

As will be apparent from the foregoing, according to the present invention, the groove tracks are intermittently formed in a control data section of a lead-in area except for regions adjacent to prepits to disable the reproduction of control data, even if they are recorded in the control data section, thereby making it possible to realize an optical recording medium which can prevent unauthorized copies of recorded information data. Moreover, not limited to the control data section of the lead-in area, a recorded signal can be prohibited from being read from any arbitrary portion of an optical disc by providing the intermittent track grooves according to the present invention in such portion.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. A recording medium comprising:
   a control data area in which control data is prerecorded; and
   an information data area in which information data is to be recorded,
   wherein a groove track of the control data area is divided into a plurality of groove portions by groove-absent portions, the groove portions including a basic pit portion and an extension portion, and
   wherein the basic pit portion has a pit length corresponding to either one of a mark and a space of the information data.

2. The recording medium according to claim 1, wherein the information data area includes a groove track on which the information data is to be recorded.

3. The recording medium according to claim 1, wherein the control data is prerecorded as an alley of groove portions and groove absent portions.

4. The recording medium according to claim 3, wherein the alley of groove portions and groove absent portions is wobbled.

5. The recording medium according to claim 1, wherein the control data area comprises a plurality of ECC (Error Correction Code) blocks, each of which includes physical format information.

6. The recording medium according to claim 1, wherein the control data area is located in a lead-in area of the recording medium.

7. A method of manufacturing an optical recording medium on which information data is to be recorded, comprising:
   recording a control data to form a control data area; and
   forming an information data area in which the information data is to be recorded,
   wherein a groove track of the control data area is divided into a plurality of groove portions by groove-absent portions, the groove portions including a basic pit portion and an extension portion, and
   wherein the basic pit portion has a pit length corresponding to either one of a mark and a space of the information data.

8. The method according to claim 7, wherein forming an information data area includes forming a groove track on which the information data is to be recorded.

9. The method according to claim 7, wherein the control data is prerecorded as an alley of groove portions and groove absent portions.

10. The method according to claim 9, wherein the alley of groove portions and groove absent portions is wobbled.

11. The method according to claim 7, wherein the control data area comprises a plurality of ECC (Error Correction Code) blocks, each of which includes physical format information.

12. The method according to claim 7, wherein the control data area is formed in a lead-in area of the recording medium.

13. The recording medium according to claim 1, wherein the extension portion has a predetermined length.

14. The recording medium according to claim 1, wherein the length of the extension portion is determined in accordance with a length of the groove-absent portion succeeding to the extension portion.

15. The recording medium according to claim 1, wherein the length of the extension portion is proportional to a length of the groove-absent portion succeeding to the extension portion.

16. The method according to claim 7, wherein the extension portion has a predetermined length.

17. The method according to claim 7, wherein the length of the extension portion is determined in accordance with a length of the groove-absent portion succeeding to the extension portion.

18. The method according to claim 7, wherein the length of the extension portion is proportional to a length of the groove-absent portion succeeding to the extension portion.

* * * * *